(12) United States Patent
Pahlow

(10) Patent No.: US 8,800,746 B1
(45) Date of Patent: Aug. 12, 2014

(54) LIFT ASSEMBLY

(75) Inventor: Joseph R. Pahlow, Oshkosh, WI (US)

(73) Assignee: Arrowhead Systems, Inc., Oshkosh, WI (US)

( * ) Notice: Subject to any disclaimer, the term of this patent is extended or adjusted under 35 U.S.C. 154(b) by 104 days.

(21) Appl. No.: 13/272,453

(22) Filed: Oct. 13, 2011

Related U.S. Application Data

(60) Provisional application No. 61/392,710, filed on Oct. 13, 2010.

(51) Int. Cl.
*B65G 37/00* (2006.01)

(52) U.S. Cl.
USPC .................. 198/346.3; 198/345.3; 198/460.1

(58) Field of Classification Search
CPC ....................................... B65G 37/00
USPC ............ 198/346.3, 465.1, 345.3; 414/222.04
See application file for complete search history.

(56) References Cited

U.S. PATENT DOCUMENTS

| | | | |
|---|---|---|---|
| 3,355,008 A | 11/1967 | Milazzo | |
| 3,934,707 A | 1/1976 | Bowman | |
| 4,364,471 A * | 12/1982 | Furlette et al. | 198/751 |
| 4,407,404 A * | 10/1983 | Rise et al. | 198/774.1 |
| 4,511,030 A | 4/1985 | Lem | |
| 4,598,815 A | 7/1986 | Adama | |
| 4,684,308 A * | 8/1987 | Dorner | 414/795.3 |
| 5,006,028 A * | 4/1991 | Jackson | 414/222.04 |
| 6,062,376 A * | 5/2000 | Nerenhausen, Sr. | 198/809 |
| 6,168,007 B1 * | 1/2001 | Tarlton | 198/460.1 |
| 6,170,649 B1 | 1/2001 | Radandt et al. | |
| 6,220,420 B1 | 4/2001 | Jan et al. | |
| 6,435,330 B1 * | 8/2002 | Bonora et al. | 198/346.3 |
| 6,612,426 B1 | 9/2003 | Guerra et al. | |
| 6,848,563 B2 | 2/2005 | Abert et al. | |
| 7,014,033 B2 * | 3/2006 | Sticht et al. | 198/465.1 |
| 7,073,444 B2 | 7/2006 | Alonso et al. | |
| 7,225,722 B2 * | 6/2007 | Angue et al. | 92/88 |
| 7,909,158 B2 * | 3/2011 | Noe et al. | 198/463.3 |
| 2007/0225858 A1 * | 9/2007 | Martin et al. | 700/213 |

\* cited by examiner

*Primary Examiner* — Ramya Burgess
*Assistant Examiner* — Thomas Randazzo
(74) *Attorney, Agent, or Firm* — Boyle Fredrickson S.C.

(57) ABSTRACT

A lift assembly for use in conjunction with a conveyor to lift item(s) off of the conveyor and remove the item(s) from the conveying path. The lift assembly may include a housing having housing side walls and a bottom wall, and a carriage having carriage side walls and a carriage bottom wall. The carriage is movable with respect to the housing. The lift assembly may further include a track that receives a guide member of the carriage for guiding the carriage as it is raised and lowered with respect to the housing. The lift assembly may further include an actuator that causes the carriage to be raised and lowered.

18 Claims, 17 Drawing Sheets under the conveying member is shown in FIGS. 1-9.
LIFT ASSEMBLY

CROSS REFERENCE TO RELATED APPLICATIONS

This application is based on and claims the benefit of provisional patent application Ser. No. 61/392,710 filed Oct. 13, 2010, the entirety of which is hereby expressly incorporated by reference.

BACKGROUND OF THE INVENTION

The present invention relates generally to a lift assembly for use in conjunction with a conveyor system, for lifting an item off of the conveyor system to remove the item from the conveying path.

BACKGROUND AND SUMMARY

In operation of a conveyor system, it is sometimes desirable to lift an item or items off of and above the conveying member of the conveyor system, thus preventing movement of the lifted item or items along the conveying path. The lifting of an item or items off the conveying member is typically coupled with advancing upstream item(s) along the conveying path, in order to eliminate spaces between conveyed items and therefore maximize the efficiency of operation of the conveyor system. In this manner, the conveyed items can be accumulated on the conveying path at the location of the furthermost downstream items for subsequent movement and processing.

The present invention is directed to a lift assembly for use with a conveyor system, which is operable to lift the conveyed item(s) above the conveying member of the conveyor system. In one embodiment, the lift assembly of the present invention includes a housing, a carriage supported by the housing, a track, and a guide member received within the track and operably attached to the carriage. The guide member moves along the track as the carriage is raised and lowered with respect to the housing. The lift assembly may further include an actuator that is attached to the housing on one end and to the carriage on the other. The housing may have two side walls located one on either side of a conveying path and a bottom wall between the two side walls. The carriage is supported by the housing and includes two carriage side walls located one on either side of the conveying path, a carriage bottom wall, and a pair of supports. Each support is supported by a respective carriage side wall and extends inwardly toward the conveying path. The lift assembly may include a pair of guide members, with each guide member being supported by a respective carriage side wall. A pair of tracks guide the carriage as it is raised and lowered with respect to the housing. Each track receives a respective guide member. Further, the lift assembly includes an actuator for raising and lowering the carriage with respect to the housing. The track may be in the form of a slot in a wall, or it may be formed by a bracket attached to a wall.

In another embodiment, the lift assembly includes a housing having two side walls located one on either side of a conveying path and a bottom wall below the conveying path. The carriage is supported by the housing that includes two carriage side walls located one on either side of the conveying path, a carriage bottom wall, and a pair of supports. Each support is supported by a respective carriage side wall and extends inwardly toward the conveying path. The carriage further includes a pair of guide members that are supported by a respective carriage side wall. The lift assembly includes a pair of tracks that guide the carriage as it is raised and lowered with respect to the housing, with each track receiving a respective guide member. Further, an actuator raises and lowers the carriage with respect to the housing. One end of the actuator is attached to the housing and the opposite end of the actuator is attached to the carriage, and the actuator is situated between the side walls of the housing. The carriage bottom wall may have an aperture through which the actuator extends. In such a configuration, the actuator may be attached to an upper surface of the carriage bottom wall.

Various other features, objects and advantages of the invention will be made apparent from the following description taken together with the drawings.

BRIEF DESCRIPTION OF THE DRAWINGS

The present invention is illustrated in the accompanying drawings in which like reference numerals represent like parts throughout.

In the drawings.

DETAILED DESCRIPTION

Figure 1:
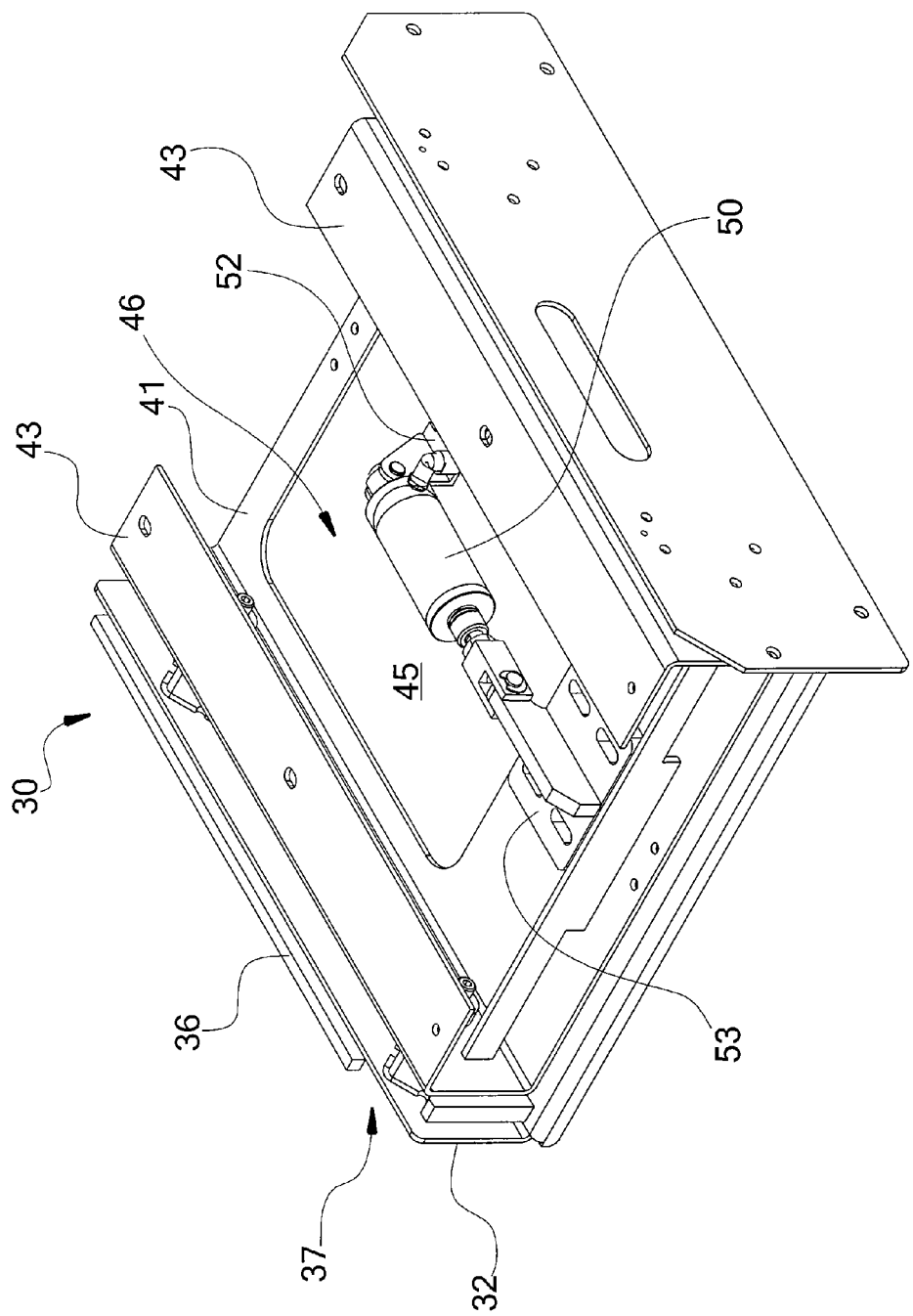
FIG. 1 is an isometric view of one embodiment of a conveyor lift assembly in accordance with the present invention.

A conveyor system 10 including one embodiment of a lift assembly 30 of the present invention is shown in FIGS. 1-9. The conveyor system 10 includes side rails or supports 12 that are substantially parallel to one another. The side supports 12 cooperate to define a conveying path 14 along which items may be transported by one or more conveying members 16, e.g., a belt (or multiple belts), tabletop assembly, etc. In one embodiment, the side supports 12 extend above the conveying member 16 to prevent items from falling off of the conveyor system 10.

A series of support members 18 cooperate with the side supports 12 to form a frame 11 of the conveyor system 10. The support members 18 are spaced apart from one another along the conveying path 14 and are substantially perpendicular to the side supports 12. The number and spacing of support members 18 may vary as desired.

In addition to the conveying member 16, the conveyor system 10 includes guide rails 17 that are substantially parallel to the conveying member 16 and side supports 12. The guide rails 17 are supported by and may be secured to the support members 18. In one embodiment there are three spaced apart guide rails 17 that support a conveying member 16. See FIG. 6. However, the number of guide rails 17 may vary as desired. For example, the embodiment shown in FIG. 14 has four guide rails 17. The guide rails 17 help to guide the conveying member 16, which is driven by an actuator (not shown) such as a motor in a manner as is known, along the conveying path 14 so that the conveying member 16 remains aligned with respect to the conveying path 14.

The conveyor assembly 10 further includes a lift assembly 30 that enables an item or items to be lifted off of and above the conveying member 16, thus preventing the conveying member 16 from moving the lifted item or items along the conveying path 14. Such a function, i.e., preventing an item from being transported along the conveying path 14 while allowing for the transportation of additional items along the conveying path 14, is desirable under certain circumstances. For example, in order to maximize the efficiency of the conveyor assembly 10, when down-stream items are lifted off of the conveying member 16 it may be desirable to continue to move up-stream items along the conveying path 14 until they reach the stopped, down-stream items. In other words, it is desirable to accumulate the items on the conveying path 14 at the furthest possible down-stream point until the stopped items can again be moved, to eliminate gaps between the items being conveyed.

The lift assembly 30 includes a bottom wall 31 and side walls 32. The side walls 32 are substantially parallel to one another and are substantially perpendicular to the bottom wall 31. The side walls 32 may be integral with the bottom wall 31, or, alternatively, the side walls 32 may be attached to the bottom wall 31 by any suitable means, e.g., bolts, screws, welds, etc. The side walls 32 and bottom wall 31 cooperate to form a housing 35 for a carriage 40 that may be raised and lowered by an actuator 50.

Figure 2:
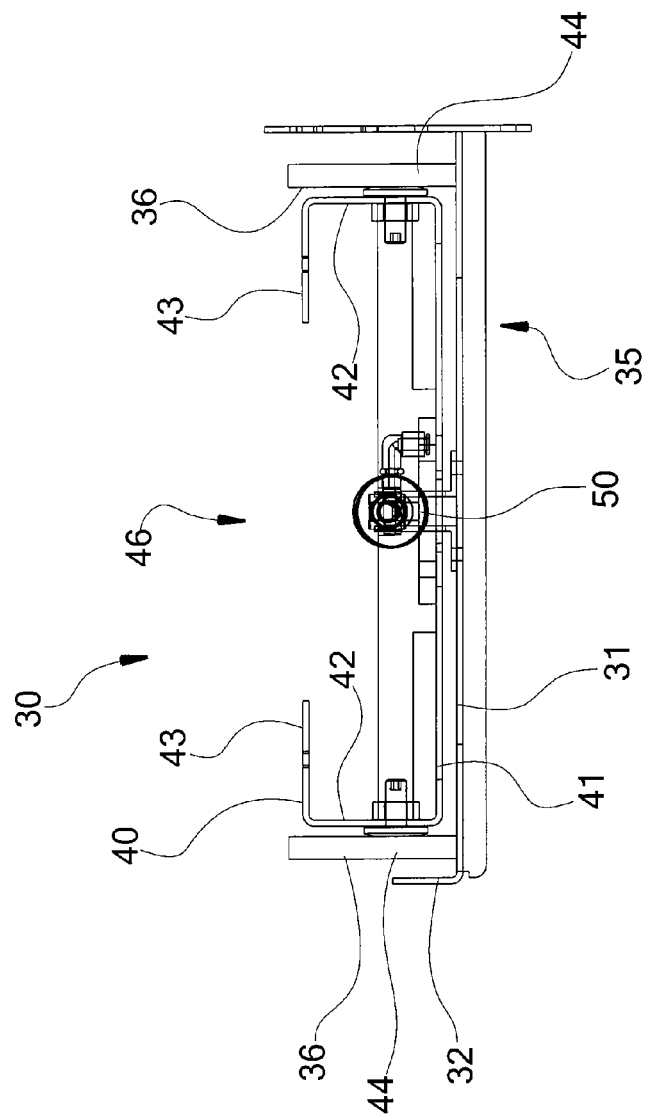
FIG. 2 is an end elevation view of the lift assembly of FIG. 1.

As shown in FIG. 2, the carriage 40 has a U-shaped cross section with two inwardly extending supports 43 in the form of plates at the top of the carriage 40. The U-shaped portion of the cross-section of the carriage 40 is formed by a carriage bottom wall 41 and two carriage side walls 42. The carriage side walls 42 are substantially parallel to one another and substantially perpendicular to the carriage bottom wall 41. The supports 43 extend inwardly from the top ends of respective carriage side walls 42. The carriage bottom wall 41, carriage side walls 42, and supports 43 may be integral with one another, or they may be separate components attached to one another by any suitable means, e.g., screws, bolts, welds, etc. The carriage 40 is sized to fit within the housing 35.

The lift assembly 30 further includes a pair of guide walls 36 that function to guide the carriage 40 as it is raised and lowered with respect to the housing 35. As shown in FIG. 2, the guide walls 36 are substantially parallel to one another. Each guide wall 36 is situated between a respective side wall 32 and carriage side wall 42. Each guide wall 36 includes a track 37 that houses a guide member 44, e.g., a roller, that is attached to the carriage 40. In the embodiment shown in FIG. 1, the respective tracks 37 are aligned on opposite sides of a longitudinal axis of the housing 35, e.g., a longitudinal axis along which the actuator 50 is aligned.

Figure 4:
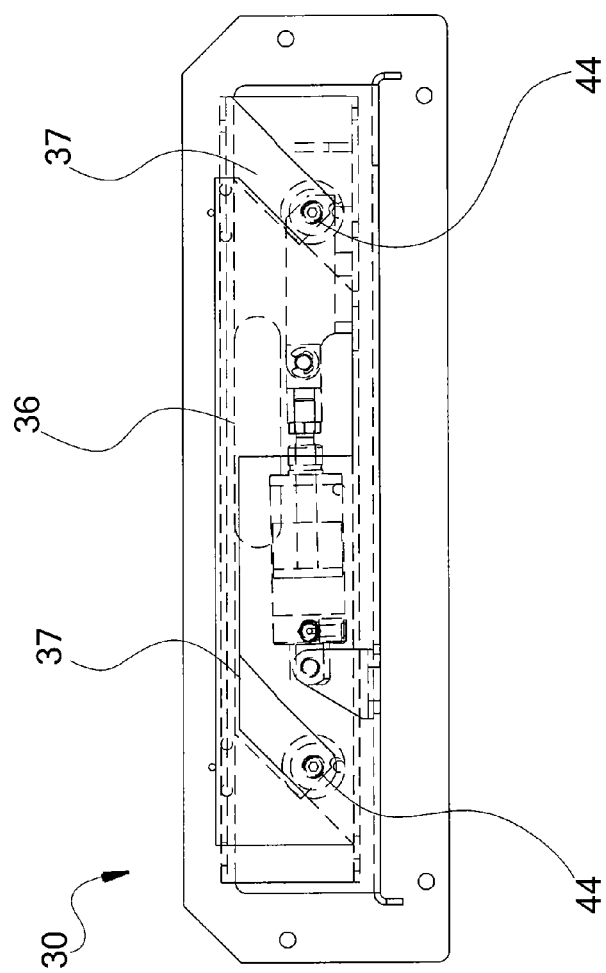
FIG. 4 is a side elevation view of the lift assembly of FIG. 1.
Figure 5:
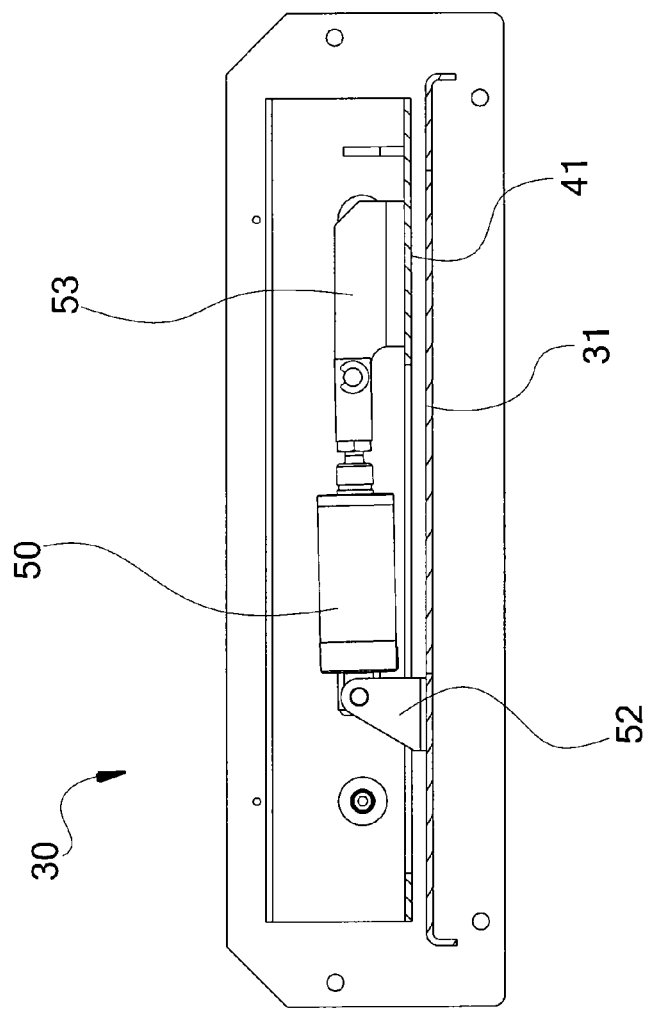
FIG. 5 is a section view of the lift assembly of FIG. 1 taken along line 5-5 of FIG. 3.
Figure 6:
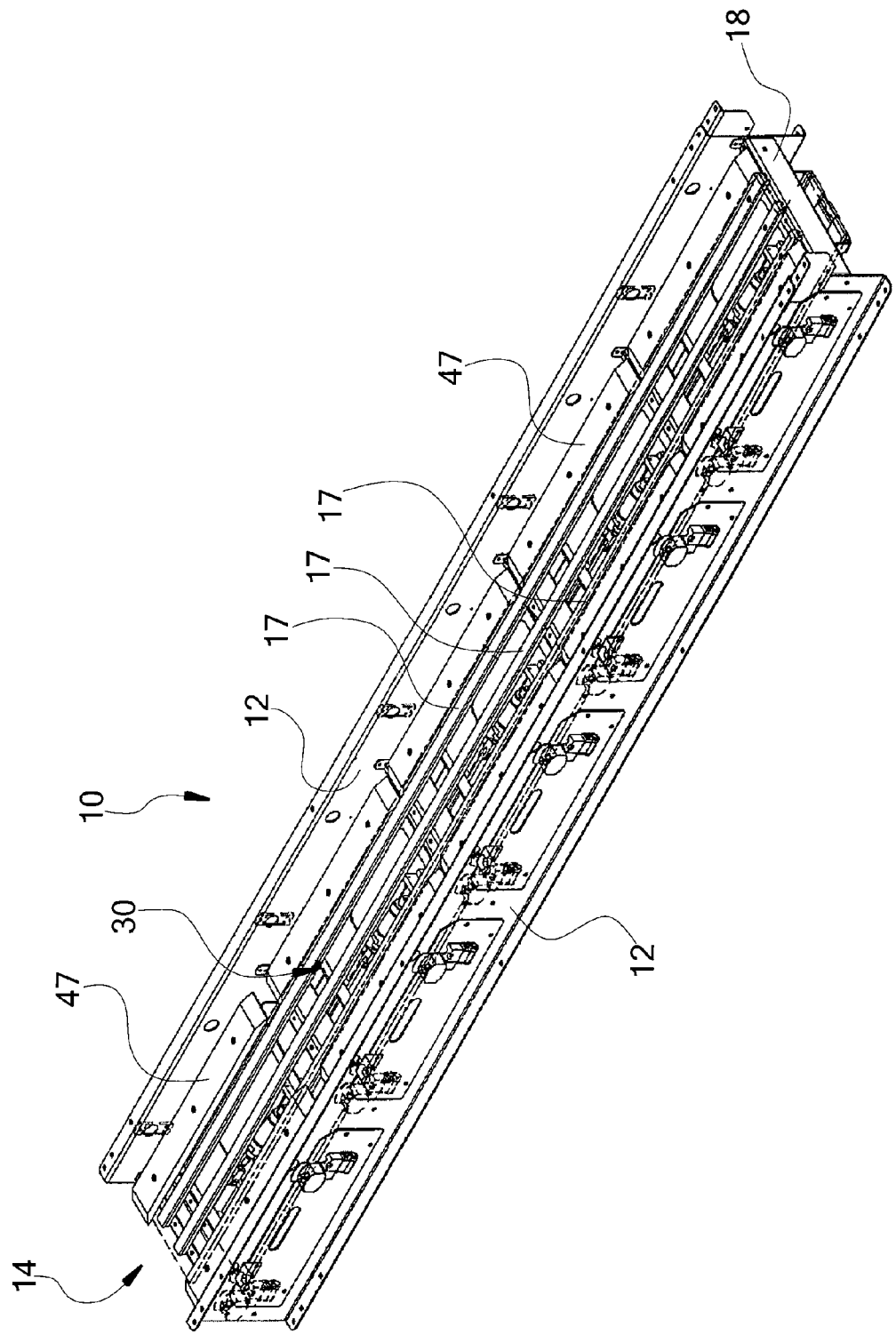
FIG. 6 an isometric view of a conveyor system incorporating the lift assembly of FIG. 1.

In one embodiment, the carriage 40 has a pair of rollers 44 that extend beyond each carriage side wall 42. Each guide wall 36 has two corresponding tracks 37 to receive a respective pair of rollers 44. As shown in FIG. 1, the track is in the form of a slot in the guide wall 36. The track 37 in the guide wall 36 is angled, thus providing a ramp along which the roller 44 may travel as the carriage is raised and lowered by the actuator 50. As shown in FIGS. 1 and 4, the track 37 is angled upwardly in the general direction of the conveying path 14. Accordingly, as the carriage 40 is raised it also travels horizontally in the direction that items are conveyed along the conveying path 14.

It should be noted that the guide member 44 is not limited to a roller. The guide member 44 can take the form of any structure capable of being received within and guided by a corresponding track 37. It should be further noted that the track/guide member arrangement could be reversed. In other words, the guide member 44 could be associated with the guide wall 36 while the track 37 could be associated with the carriage 40.

Figure 3:
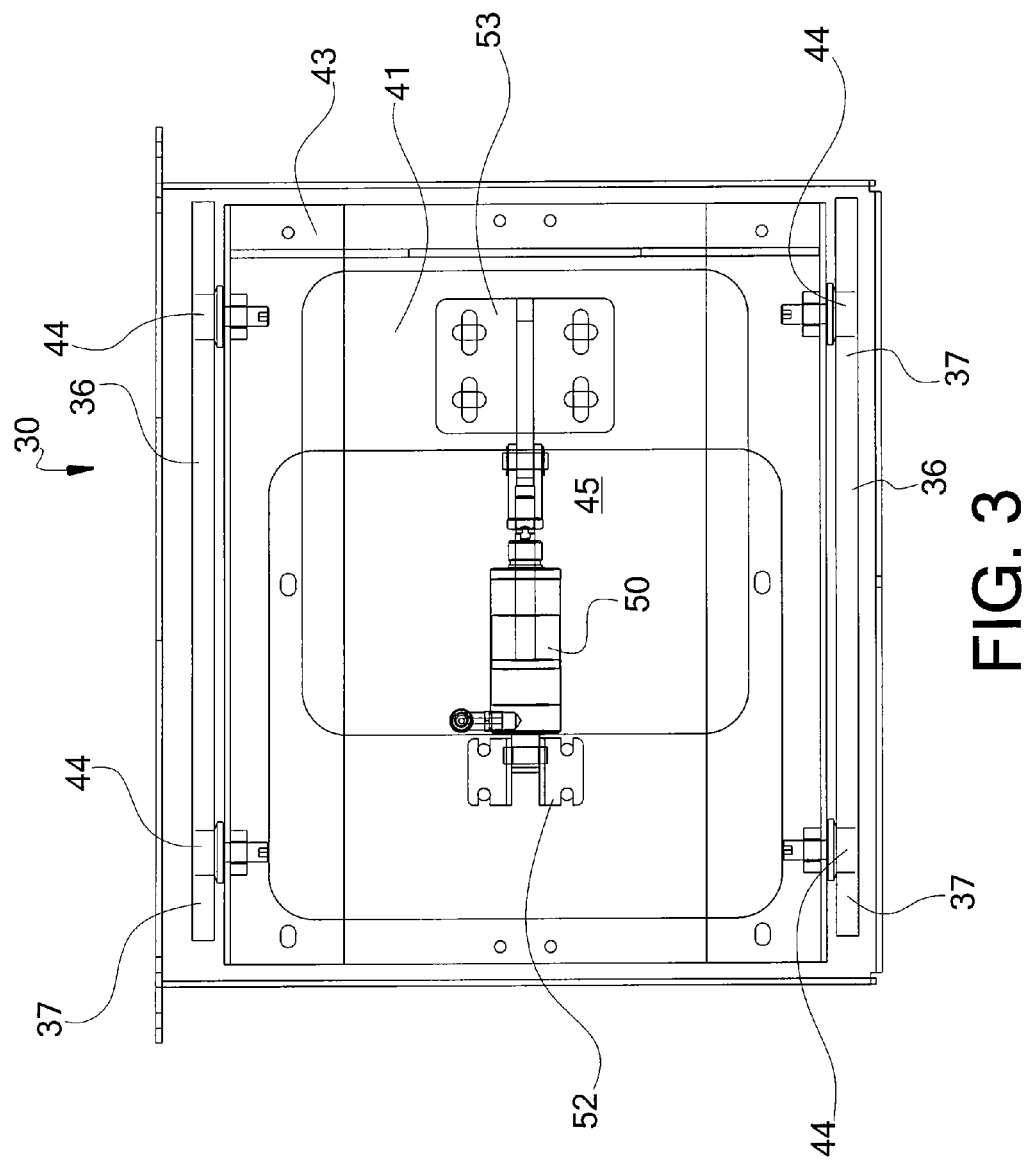
FIG. 3 is a top plan view of the lift assembly of FIG. 1.

The lift assembly 30 further includes at least one actuator 50. As shown in FIG. 3, one embodiment features a single actuator 50 that is generally centered between the side walls 32 of the housing 35. On one end, the actuator 50 is pivotably coupled to a bracket 52 that is secured to the bottom wall 31 of the lift assembly 30. The other end of the actuator 50 is rotatably coupled to a bracket 53 that is secured to the carriage 40. As shown in FIG. 1, the actuator 50 extends through an aperture 45 in the bottom wall 41 of the carriage 40. The aperture 45 is sized to enable the actuator 50 to freely extend and retract so as to raise and lower the carriage 40 as desired. Alternatively, the aperture 45 could be eliminated and the actuator 50 could be attached to a bottom side of the bottom wall 41 of the carriage 40.

Figure 7:
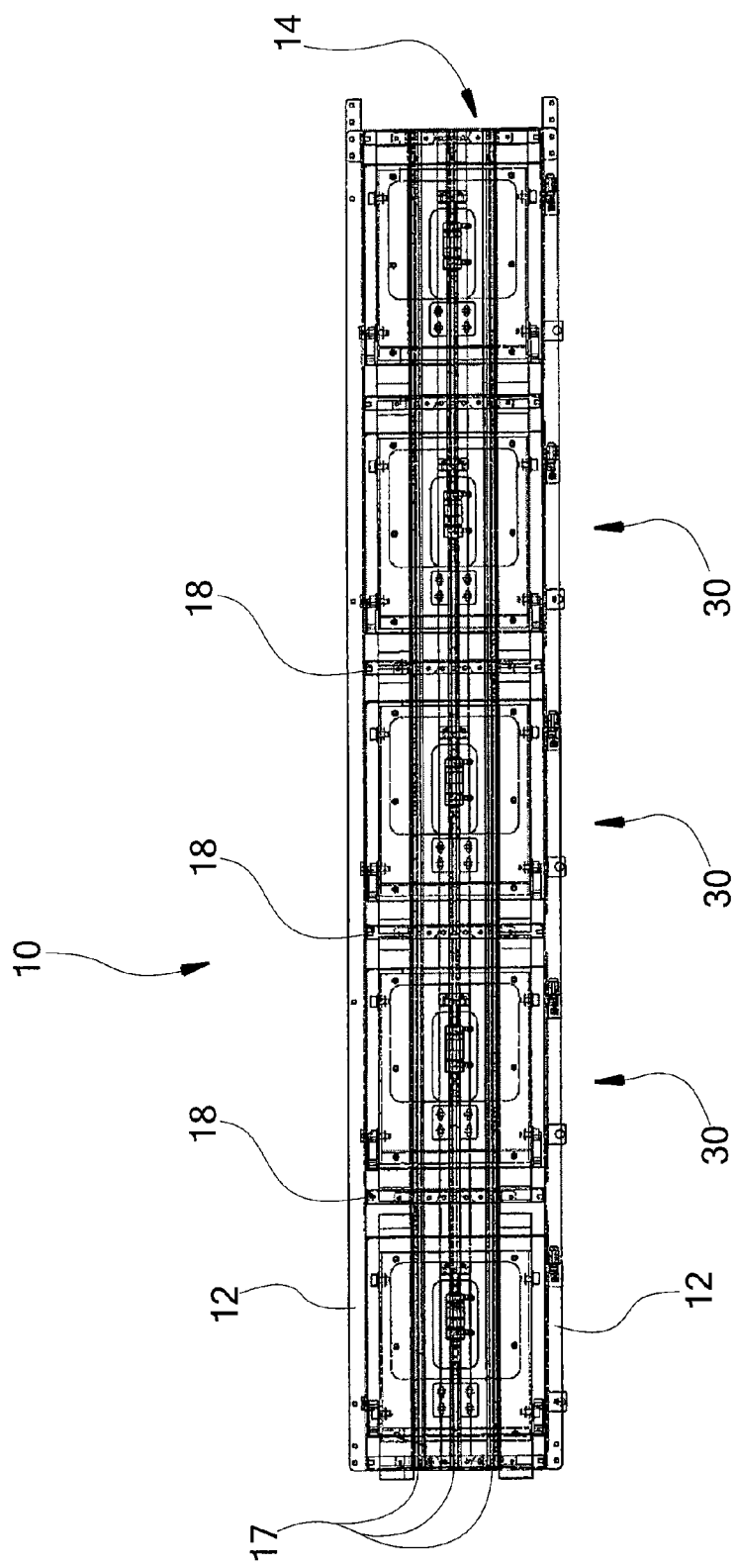
FIG. 7 is a top plan view of the conveyor system of FIG. 6.
Figure 8:
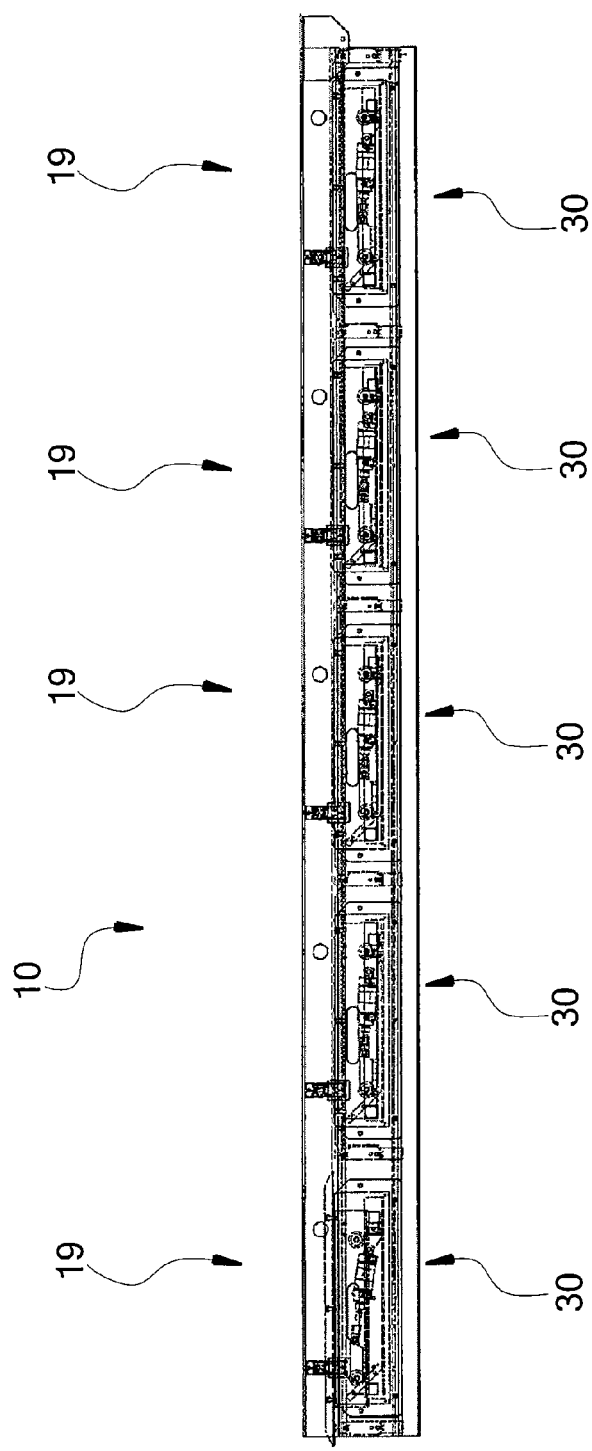
FIG. 8 is a side elevation view of the conveyor system of FIG. 6.
Figure 9:
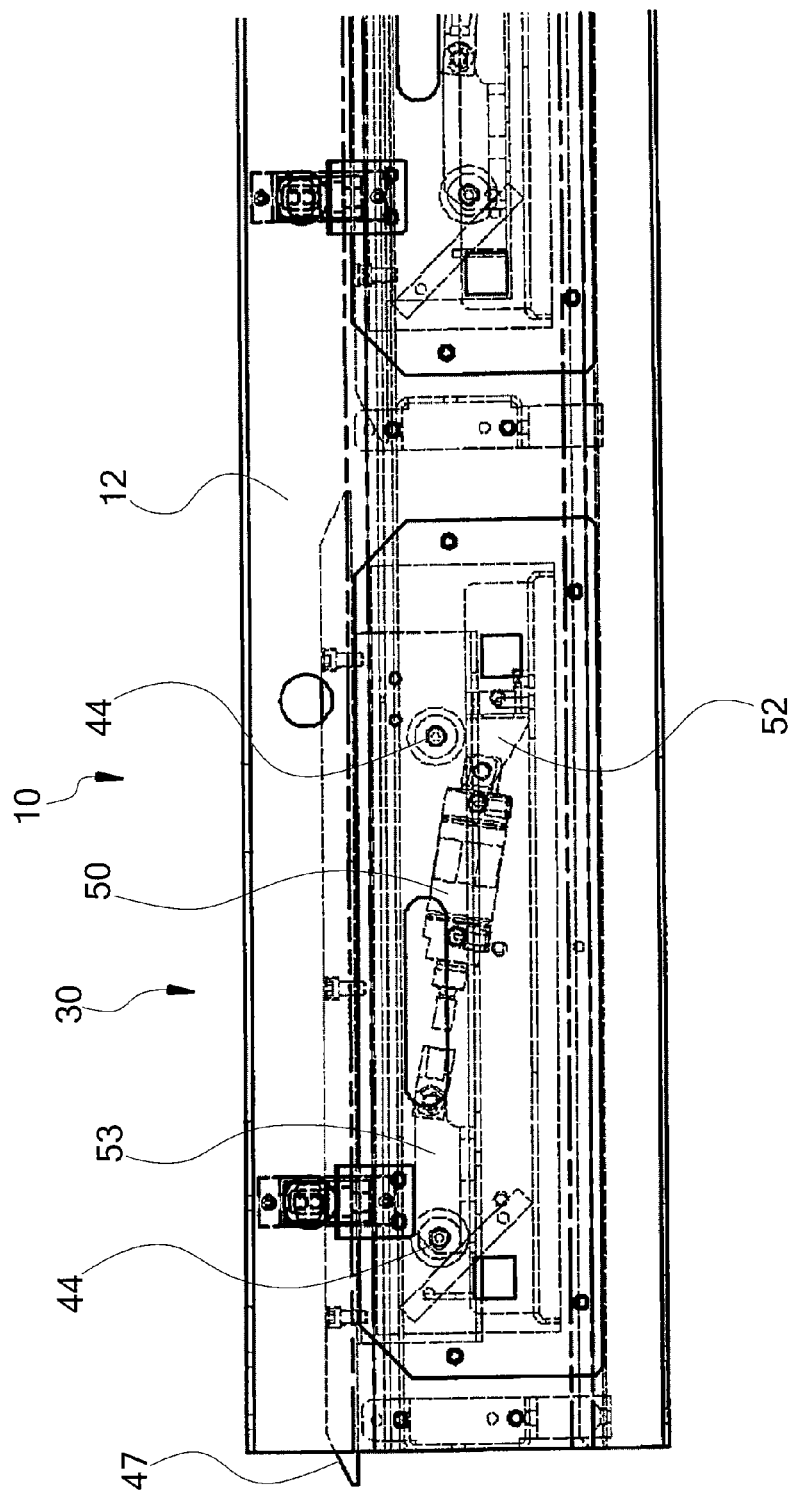
FIG. 9 is an enlarged partial side view of the conveyor system of FIG. 6.
Figure 10:
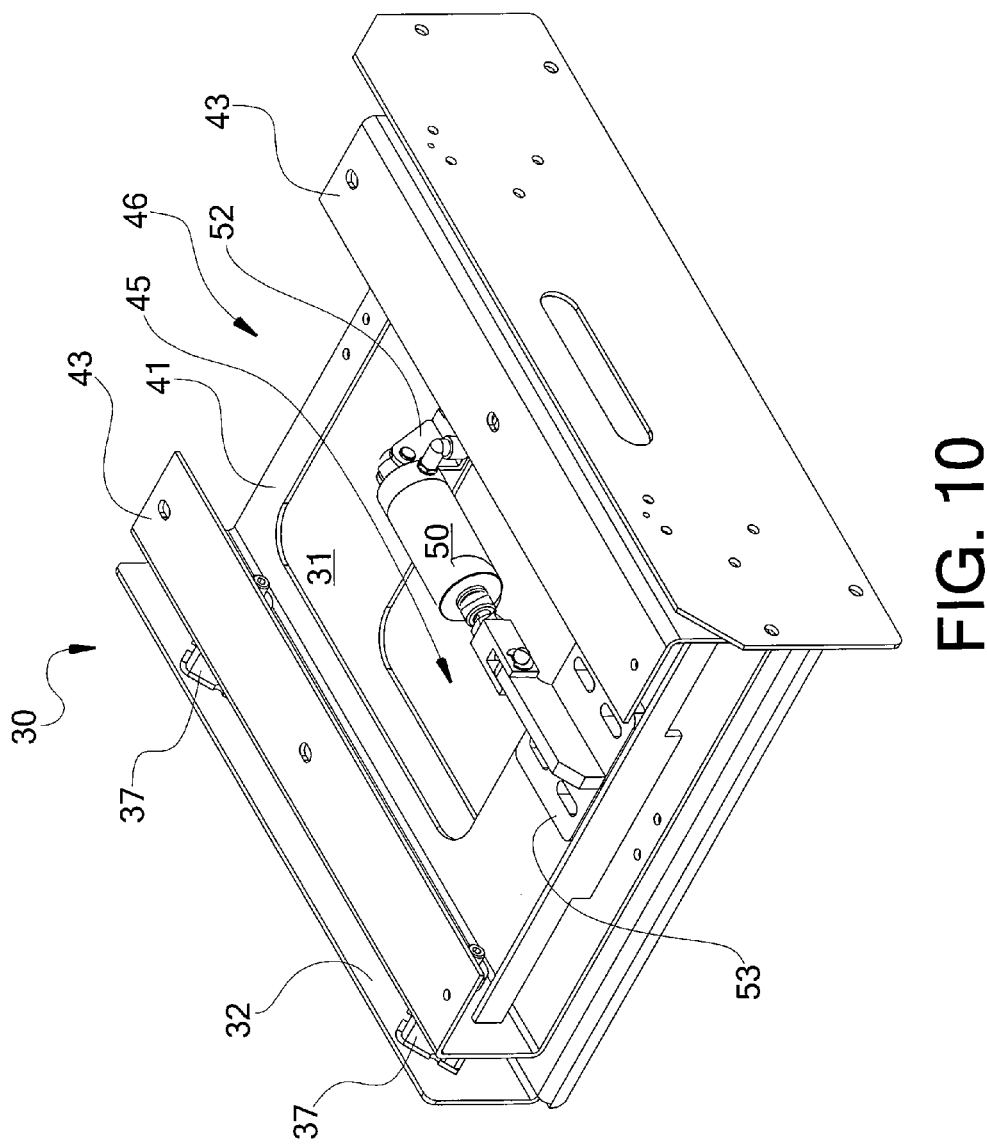
FIG. 10 is an isometric view of a second embodiment of the lift assembly of the present invention.

As shown in FIG. 7, in one embodiment the actuator 50 is positioned within the footprint of the conveying system 10 and is situated beneath the conveying member 16. Moreover, the actuator 50 may be centered between the side supports 12 of the conveying system 10.

In one embodiment, the actuator 50 is a pivotably mounted piston assembly. Thus, during operation, the piston rod is extended to move the carriage 40 along the tracks 37 in the guide walls 36. Since the tracks 37 are angled upwardly in the same general direction in which the piston rod extends, the carriage 40 is driven upward to a raised position along the tracks 37 by the actuator 50. Conversely, as the piston rod is retracted, the carriage 40 is pulled downwardly along the tracks 37, thus lowering the carriage 40 with respect to the housing 35 to its initial, lowered position.

As shown in FIGS. 6-9, the lift assembly 30 may be integrated into the conveyor system 10. More specifically, the lift assembly 30 is sized to fit between the side supports 12 of the conveyor system 10, and it is positioned such that the side walls 32 are substantially parallel to the side supports 12. The lift assembly 30 is positioned so that the conveying member 16 and guide rails 17 are positioned between the supports 43 of the lift assembly. In other words, there is a gap 46 between the supports 43 within which the conveying member 16 and guide rails 17 are situated. In one embodiment, corresponding lift members 47 may be attached to the supports 43. The lift members 47 may be integral with the supports 43, or they may be separate components that are attached to respective supports 43 by any suitable means.

When the carriage 40 is in the lowered position, the top surface of the support 43 (and lift member 47, if applicable) lies in a plane that is lower than the top surface of the conveying member 16. See, e.g., FIGS. 14 and 15. Thus, the support 43 (and lift member 47, if applicable) will not contact, and therefore will not interfere with, the transportation of the item(s) along the conveying path 14. Alternatively, the top surface of the support 43 (and lift member 47, if applicable) may lie in the same plane as the top surface of the conveying member 16. Accordingly, item(s) may slide along the support 43 (and lift member 47, if applicable) while being transported by the conveying member 16 along the conveying path 14. When the support 43 is raised, the top surface of the support 43 lies in a plane that is higher than the top surface of the conveying member 16, to suspend movement of the item(s). See, e.g., FIGS. 16 and 17.

Figure 11:
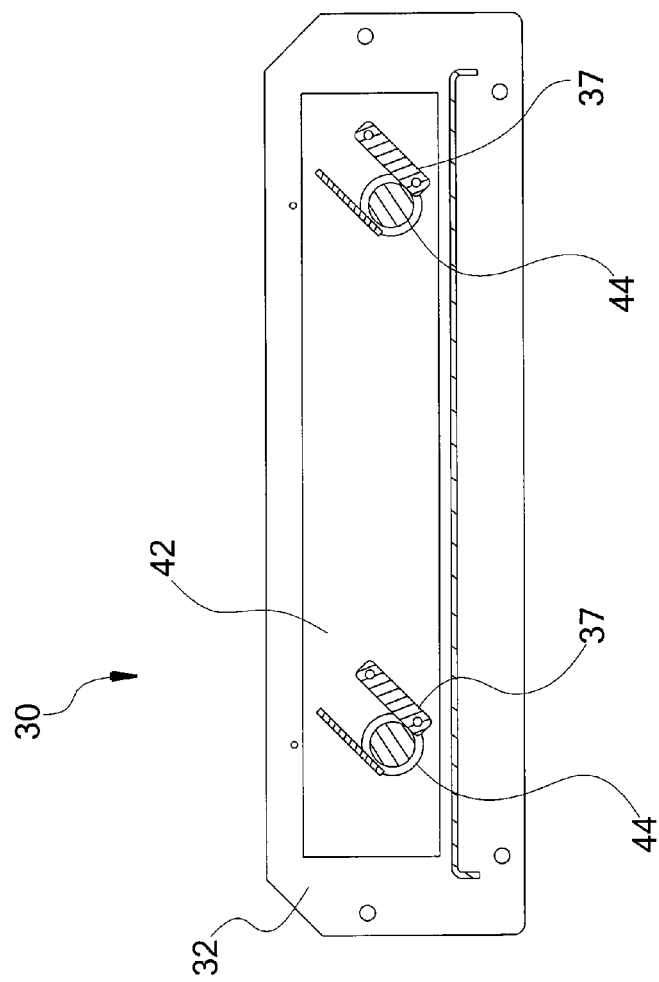
FIG. 11 is a cross-sectional view of the lift assembly of FIG. 10 taken along line 11-11 of FIG. 10.
Figure 12:
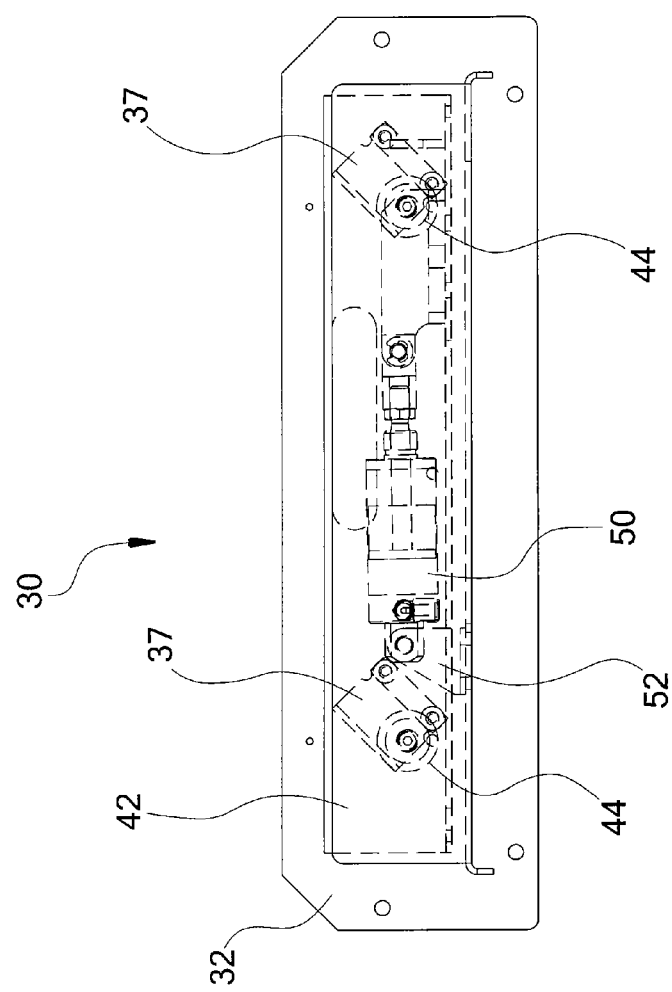
FIG. 12 is a cross-sectional view of the lift assembly of FIG. 10 taken along line 12-12 of FIG. 10.
Figure 13:
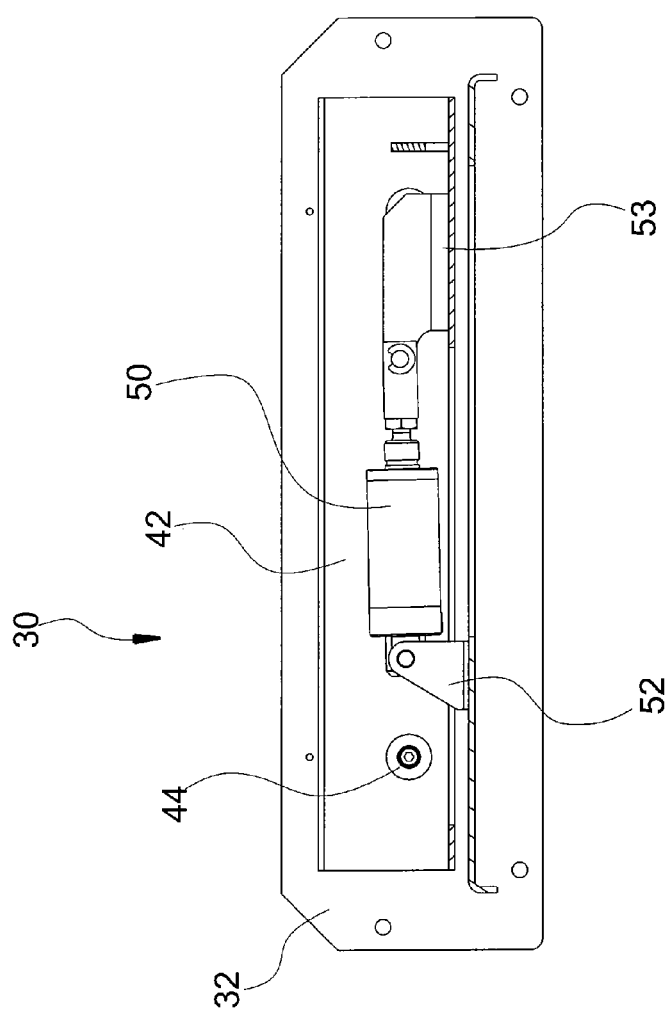
FIG. 13 is a cross-sectional view of the lift assembly of FIG. 10 taken along line 13-13 of FIG. 10.

Another embodiment of the lift assembly 30 of the present invention is shown in FIGS. 10-16, and like reference characters will be used where possible to facilitate clarity. In this embodiment, the tracks 37 are separate components, such as brackets, that are attached to the side walls 32 with one or more fasteners, e.g., bolts. Alternatively, the tracks 37 may be integral with the side walls 32. As shown in FIG. 11, the tracks 37 are sized to receive the guide member 44. In this embodiment, the guide wall 36 has been eliminated.

Figure 14:
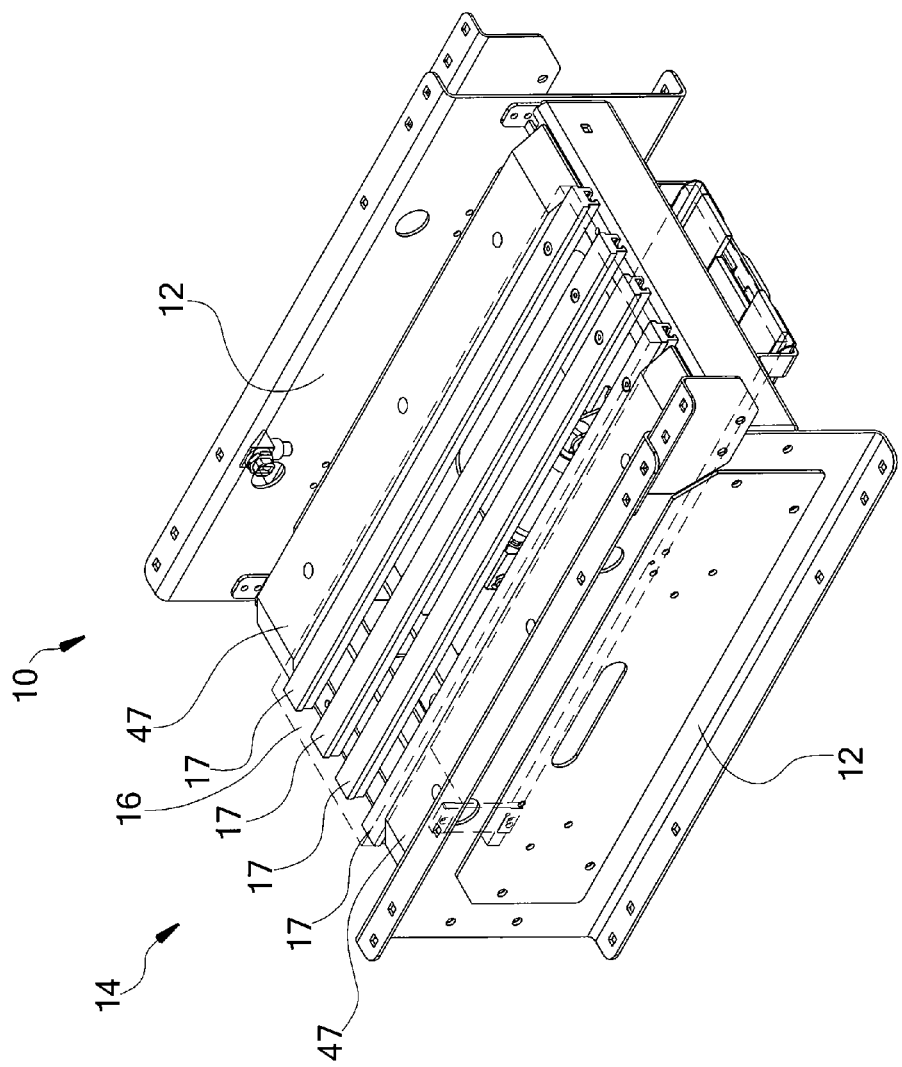
FIG. 14 is an isometric view of the lift assembly of FIG. 10 in a lowered position.
Figure 15:
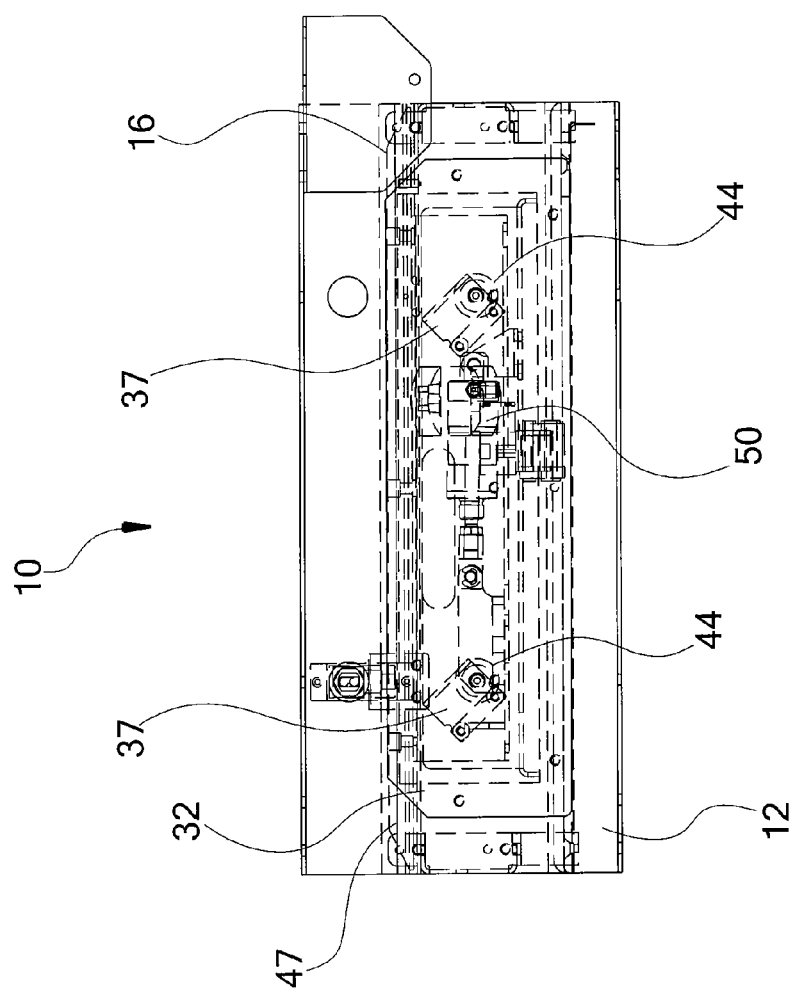
FIG. 15 is a side elevation view of the lift assembly of FIG. 10 in the lowered position.
Figure 16:
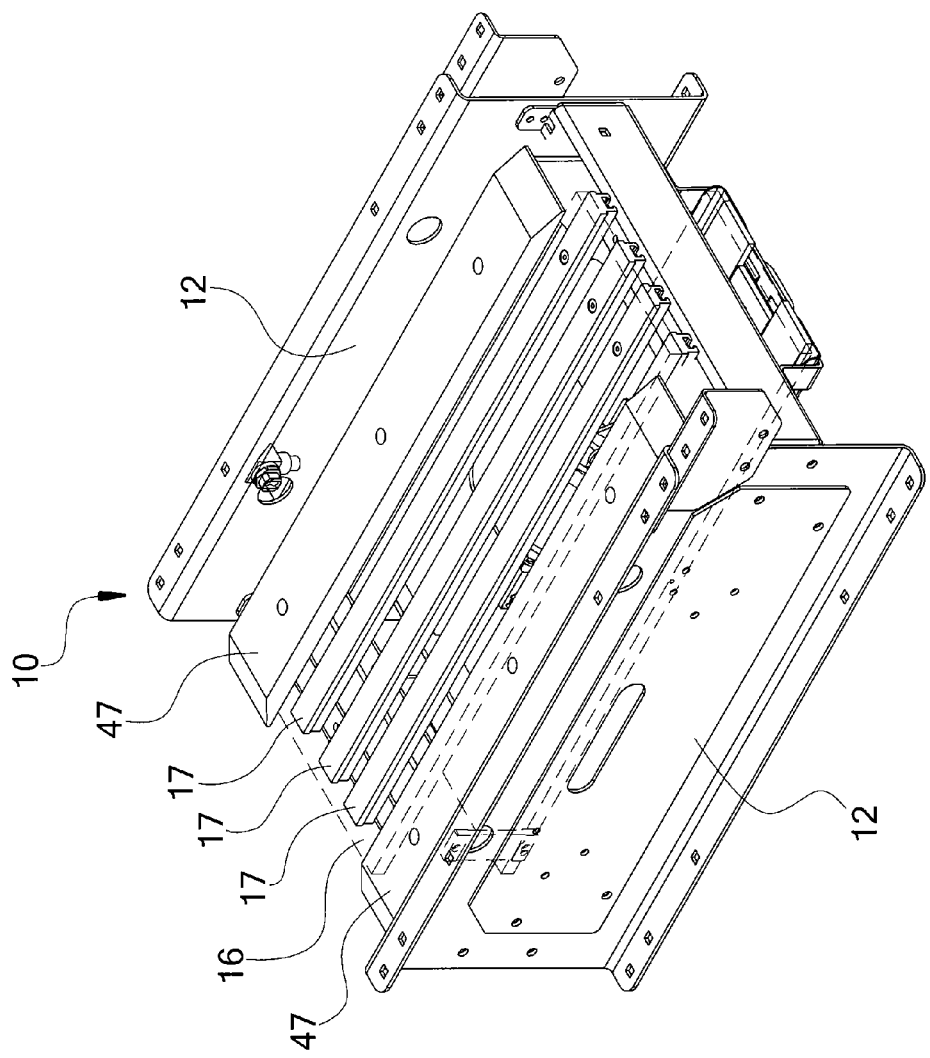
FIG. 16 is an isometric view of the lift assembly of FIG. 10 in a raised position.
Figure 17:
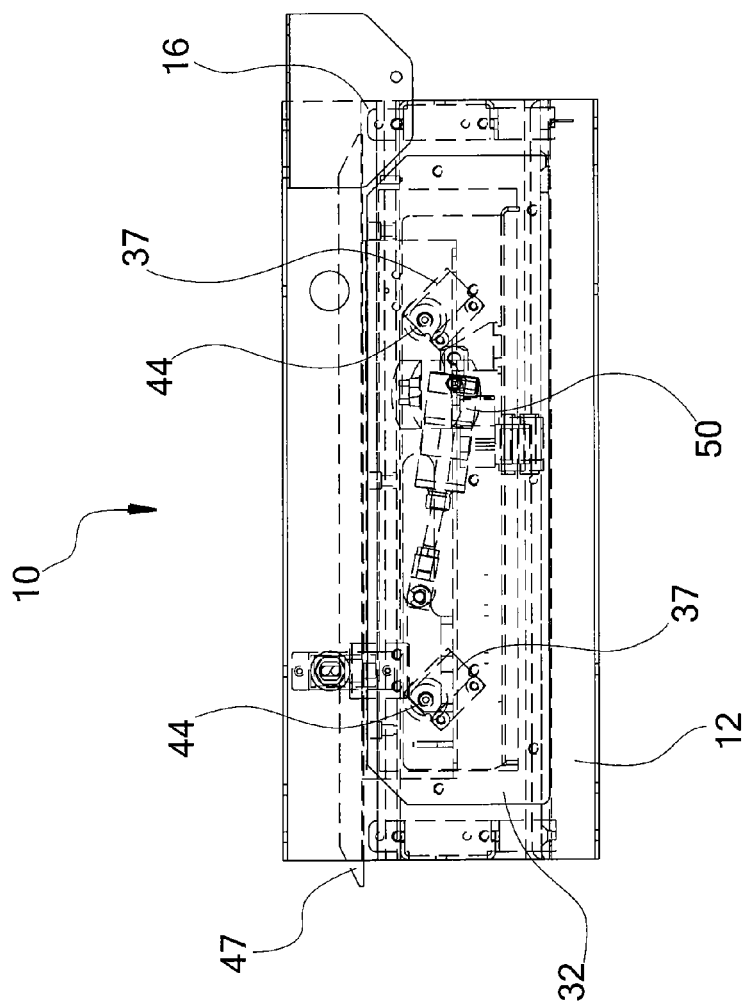
FIG. 17 is a side elevation view of the lift assembly of FIG. 10 in the raised position.

As shown in FIGS. 14 and 16, the actuator 50 lies within the footprint of the conveying member 16. The actuator 50 is aligned along a central longitudinal axis of the conveying member 16, and the lift members 47 are evenly spaced on either side of the central longitudinal axis of the conveying member 16. Thus, the load of an item to be lifted may be evenly distributed with respect to the lift members 47 and actuator 50.

Multiple lift assemblies 30 may be incorporated into the conveyor system 10 in a sequential manner to form zones 19 along the length of the conveyor system 10. In such an arrangement, each lift assembly 30 would correspond to a respective zone 19 within the conveyor system 10. See FIG. 8.

Various alternatives and modifications are contemplated as being within the scope of the following claims particularly pointing out and distinctly claiming the subject matter regarded as the invention.

I claim:

1. A lift assembly for use with a conveyor configured to move items in a direction of conveyance, comprising:
   a housing comprising a pair of side walls positioned on either side of a conveying path and a bottom wall that is positioned below the conveying path;
   a carriage for engaging an item on the conveyor, wherein the carriage comprises a pair of carriage side walls on either side of the conveying path; a carriage bottom wall positioned between the bottom wall of the housing and the conveying path; and a pair of supports, each support supported by a respective carriage side wall and extending inwardly toward the conveying path;
   a track attached to the housing, the track being angled relative to the direction of conveyance and configured to support the carriage as the carriage moves relative to the housing;
   a guide member received within and movable along the track and operably attached to the carriage;
   an actuator attached at a first end to the carriage and at a second end to the housing for moving the guide member along the track;
   wherein the angle of the track is configured such that, as the guide member moves along the track, the carriage is raised and lowered with respect to the housing.

2. The lift assembly of claim 1, wherein the guide member is a roller and wherein the actuator is a piston.

3. The lift assembly of claim 2, wherein the actuator is aligned along a longitudinal axis near the center of the lift assembly.

4. The lift assembly of claim 1, wherein the track is one of a pair of angled tracks and the guide member is one of a pair of guide members, the lift assembly further comprising:
   a pair of guide walls, each guide wall supporting one of the tracks and positioned between a respective side wall of the housing and a carriage side wall.

5. The lift assembly of claim 4, wherein each track is formed by a slot in a respective guide wall.

6. The lift assembly of claim 1, wherein the track is one of a pair of angled tracks, each track being formed by a bracket attached to a respective side wall of the housing.

7. A lift assembly for use with a conveyor configured to move items along a conveying path in a direction of conveyance, comprising:
   a housing having two side walls located one on either side of the conveying path and a bottom wall between the two side walls;
   a carriage for engaging an item on the conveyor, the carriage being supported by the housing and comprising:
      two carriage side walls located one on either side of the conveying path,
      a carriage bottom wall,
      a pair of supports, each support being supported by a respective carriage side wall and extending inwardly toward the conveying path, and
      a pair of guide members, each guide member being supported by a respective carriage side wall;
   a pair of tracks that guide the carriage as it is raised and lowered with respect to the housing, each track receiving a respective guide member and being angled relative to the direction of conveyance so as to support the carriage as it is raised and lowered; and
   an actuator configured to move the carriage along the tracks for raising and lowering the carriage with respect to the housing.

8. The lift assembly of claim 7, wherein the conveying path is defined by a conveyor belt that passes between the side walls of the housing.

9. The lift assembly of claim 7, wherein when the carriage is in a lowered position, the top surfaces of the supports are substantially coplanar with the conveying path.

10. The lift assembly of claim 7, wherein when the carriage is in a lowered position, the top surfaces of the supports are below the conveying path.

11. The lift assembly of claim 7, wherein when the carriage is in a raised position, the top surfaces of the supports are above the conveying path.

12. The lift assembly of claim 7, wherein the lift assembly is one of a plurality of like lift assemblies positioned along the conveying path.

13. The lift assembly of claim 7, wherein the tracks are slots formed in respective guide walls positioned between the side walls of the housing and the carriage side walls.

14. The lift assembly of claim 7, wherein the tracks are in the form of brackets supported by the side walls of the housing.

15. A lift assembly for use with a conveyor configured to move items along a conveying path in a direction of conveyance, comprising:
   a housing having two side walls located one on either side of the conveying path and a bottom wall below the conveying path;
   a carriage for engaging an item on the conveyor, the carriage being supported by the housing and comprising:

two carriage side walls located one on either side of the conveying path, a carriage bottom wall, a pair of supports, each support being supported by a respective carriage side wall and extending inwardly toward the conveying path, and a pair of guide members, each guide member being supported by a respective carriage side wall;

a pair of angled tracks that guide and support the carriage with respect to the housing, wherein the tracks are angled relative to the direction of conveyance, and each track receiving a respective guide member; and an actuator configured to move the carriage along the angled tracks for raising and lowering the carriage with respect to the housing, one end of the actuator being attached to the housing and the opposite end of the actuator being attached to the carriage, wherein the actuator is situated between the side walls of the housing.

16. The lift, assembly of claim 15, wherein the actuator is a piston that is pivotably attached to the housing by a first bracket and that is pivotably attached to the carriage by a second bracket.

17. The lift assembly of claim 16, wherein the actuator extends through an aperture in the carriage bottom wall so that the second bracket is attached to an upper surface of the carriage bottom wall.

18. The lilt assembly of claim 17, wherein the tracks are in the form of brackets attached to respective side walls of the housing and wherein the guide members are rollers that travel along the tracks.

\* \* \* \* \*